United States Patent [19]
Rousseau et al.

[11] Patent Number: 5,355,462
[45] Date of Patent: Oct. 11, 1994

[54] PROCESSOR DATA MEMORY ADDRESS GENERATOR

[75] Inventors: Emmanuel Rousseau, Paris; Alain Chateau, Herblay, both of France

[73] Assignee: Alcatel Radiotelephone, Paris, France

[21] Appl. No.: 762,821

[22] Filed: Sep. 19, 1991

[30] Foreign Application Priority Data

Sep. 19, 1990 [FR] France ................... 9011560

[51] Int. Cl.⁵ .................. G06F 12/00; G06F 9/26; G06F 9/34; G06F 15/76
[52] U.S. Cl. .................. 395/400; 395/375; 395/800; 364/251; 364/255.1; 364/255.4; 364/255.8; 364/DIG. 1
[58] Field of Search ............. 395/400, 375, 800

[56] References Cited

U.S. PATENT DOCUMENTS

| | | | |
|---|---|---|---|
| 4,202,035 | 5/1980 | Lane | 395/400 |
| 4,521,858 | 6/1985 | Kraemer et al. | 395/375 |
| 4,833,602 | 5/1989 | Levy et al. | 395/400 |
| 4,908,748 | 3/1990 | Pathak et al. | 395/400 |
| 4,935,867 | 6/1990 | Wang et al. | 395/400 |
| 5,032,986 | 7/1991 | Pathak et al. | 395/400 |

FOREIGN PATENT DOCUMENTS 0303009 of 1989 European Pat. Off. .
2849382 of 1980 Fed. Rep. of Germany .

OTHER PUBLICATIONS

"General Addressing Mechanisms For Microprocessors" by Gordon Steven and Fleur Williams, Microprocessors and Microsystems, vol. 12, No. 2, Mar. 1988, pp. 67–75.

*Primary Examiner*—Joseph L. Dixon
*Assistant Examiner*—Michael A. Whitfield
*Attorney, Agent, or Firm*—Sughrue, Mion, Zinn, Macpeak & Seas

[57] ABSTRACT

A processor data memory address generator is adapted to receive a control word from a program controller receiving instructions from a program memory addressed by an instruction counter and producing a program signal addressed to an arithmetic and logic unit. The instruction counter is incremented by a clock signal and reset by the program controller. The control word comprises location information and selection information and the address generator is adapted to produce a data address having a first part comprising bits of said location information and a second part formed by a selected set of bits of the address of the current instruction identified by said selection information.

12 Claims, 2 Drawing Sheets

ADDRESS GENERATOR

PROCESSOR DATA MEMORY ADDRESS GENERATOR

BACKGROUND OF THE INVENTION

1. Field of the Invention

The present invention concerns a processor data memory address generator.

2. Description of the Prior Art

Programmable electronic systems include a processor which executes instructions supplied by a program controller usually included in the processor. The instructions frequently cause or command operations producing output data addressed to a data memory from input data that may also be stored in said memory. The address of the data memory location for a specific instruction is supplied by an address generator.

A first known data memory addressing technique is direct addressing. In this case the address is supplied directly in the instruction supplied by the program controller.

It is widely accepted that although this technique is very simple it has severe limitations in respect of flexibility. As a result, the execution of a given task by the processor often requires a high number of instructions.

A second known technique is indirect addressing. In this case the address is computed by an address generator from the instruction supplied by the program controller. This technique offers great flexibility in terms of memory organization. The generator includes circuits clocked by a clock signal and combinatory circuits incorporating a large number of cells. Its size is therefore relatively large, whether it comprises registers or an arithmetic and logic unit, for example.

An object of the present invention is an address generator enabling an addressing mode between direct and indirect addressing which, although it does not offer the flexibility of indirect addressing, results in a reduced size and therefore a reduced cost.

SUMMARY OF THE INVENTION

The present invention comprises a processor data memory address generator adapted to receive a control word from a program controller, said program controller receiving instructions from a program memory addressed by an instruction counter and producing a program signal addressed to an arithmetic and logic unit, said instruction counter being incremented by a clock signal and reset by said program controller, wherein said control word comprises location information and selection information and said address generator comprises means for producing a data address having a first part comprising bits of said location information and a second part formed by a selected set of bits of the address of the current instruction identified by said selection information.

In the processor data memory address generator, the selection information preferably includes an extent code specifying the variable number e of bits in the second part.

In one particular embodiment, the processor memory address generator further comprises a first group of multiplexers each receiving on its first input a selected bit of said location information and on its second input a selected bit of said address of the current instruction, the nth multiplexer, for any value of n, provides as an output, the signal applied to its first input if n is greater than e or the signal applied to its second input otherwise, said second part of the data address being established on the basis of the output signals of said multiplexers of order e or lower and said first part of said address being established on the basis of the non-selected bits of said location information and the output signals of said multiplexers of order greater than e.

The processor data memory address generator preferably includes a decoder producing from the extent code selection signals for controlling the multiplexers.

Advantageously, in the processor data memory address generator an indexing set comprises at least some of the bits of said address of the current instruction each assigned an order number and said selection information also comprises an operation code specifying that said second part of the data address is made up of bits of said indexing system of order f or greater.

An additional preferred feature of the processor data memory address generator is that it comprises a second set of multiplexers of which the nth multiplexer, for any value of n, receives on its input of order k the bit of order (n+k−1) of said indexing set and has its output connected to the second input of the nth multiplexer of said first group, all the multiplexers of said second group being set to their input of order f by means of said operation code.

In a preferred embodiment of the processor data memory address generator the second part of the data address represents the low order bits of said address or is formed by consecutive bits of the address of the current instruction.

A first application of the processor data memory address generator concerns the incremental addressing of a data item assigned said data address during the repetition of a loop of $2^p$ instructions, the second part of the data address being incremented by one unit each time said loop is executed and being made up of bits of the address of the current instruction of order p or greater.

A second application of the processor data memory address generator concerns the modular addressing of a data item assigned said data address during the repetition of a loop of $2^p$ instructions, the second part of the data address being incremented by $2^q$ units on each execution of said loop where q is less than p, and comprising bits of the address of the current instruction of order (p−q) or greater.

A third application of the processor data memory address generator concerns the incremental circular addressing of a data item assigned said data address during the repetition of a loop of $2^p$ instructions r times, the second part of the data address being equal to the number of executions of said loop already done modulo a specific number $2^s$, r being the product of an integer u and $2^s$, said second part comprising bits of the address of the current instruction of order p to (p+s−1).

A fourth application of the processor data memory address generator concerns the modular circular addressing of a data item assigned said data address during the repetition of a loop of $2^p$ instructions r times, the second part of the data address being the product of a number $2^q$ and the number of executions of said loop already done modulo a particular number $2^s$, q being less than p and r being the product of an integer u and $2^s$, said second part comprising bits of the address of the current instruction of order (p−q) to (p−q+s−1).

The various objects and features of the present invention will emerge in more detail from the following description given by way of non-limiting example and with reference to the appended drawings.

DETAILED DESCRIPTION OF THE INVENTION

Items shown in both figures carry the same reference symbol.

Figure 1:
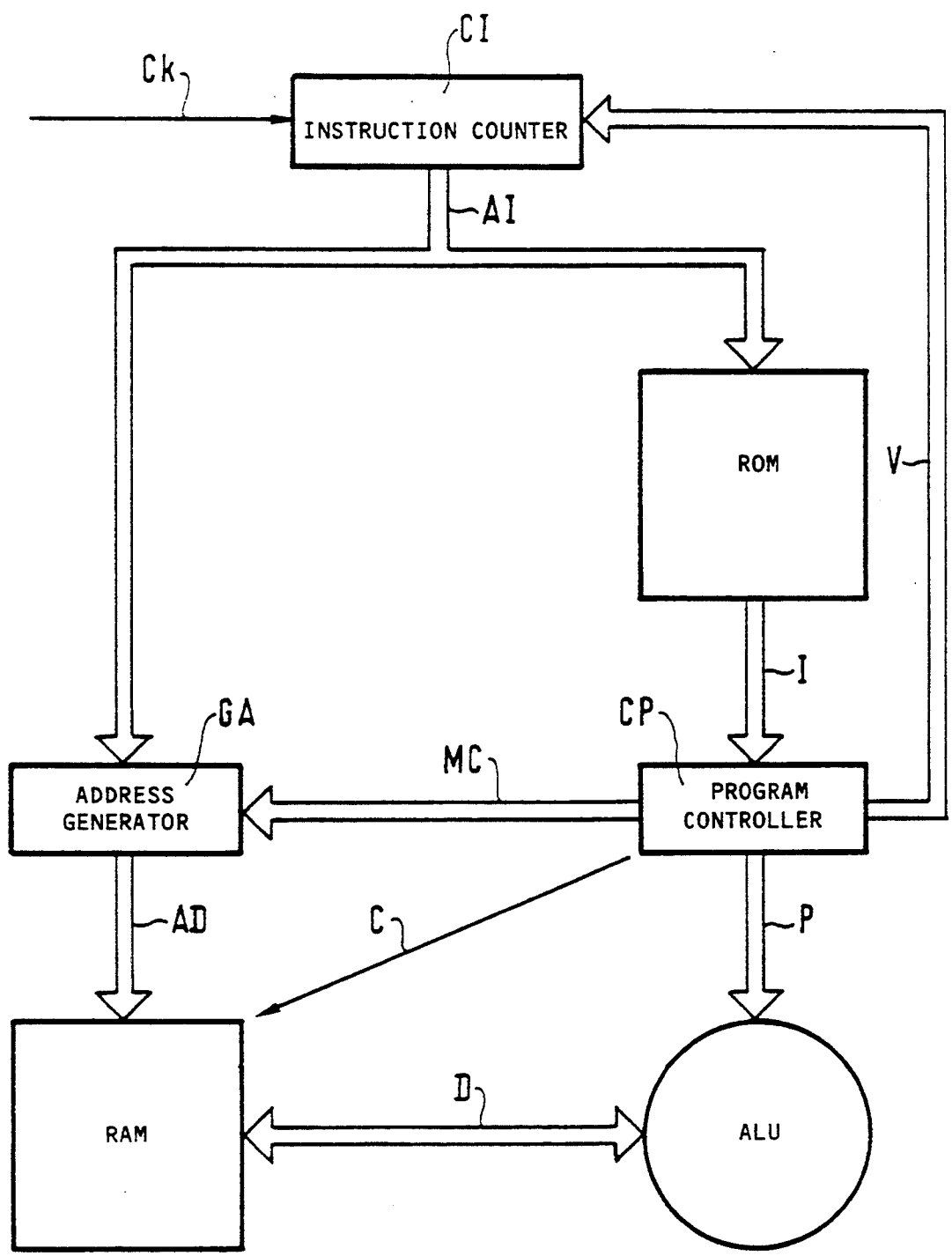
FIG. 1 a diagram of a known processor incorporating an address generator in accordance with the invention.

The address generator in accordance with the invention will now be described in the context of a known structure processor shown in FIG. 1 and comprising the following units:

An instruction counter CI delivers at its output an instruction address which is increased by one unit on each pulse of a clock signal Ck. The counter is reset by a program controller CP described below.

A program read only memory ROM produces the instruction I stored at the location identified by the instruction address output by the instruction counter.

A program controller CP receives the instruction I and can therefore set a start value V for the instruction counter CI. It also delivers a program signal P to an arithmetic and logic unit ALU, a control signal C to a data random access memory RAM associated with the ALU and a control word MC to the address generator GA.

The arithmetic and logic unit ALU writes or reads a data item D in a location of the data memory RAM identified by a data address AD.

The address generator GA produces this data address AD. In a known manner it receives the control word MC from the program controller CP. In accordance with the invention, it additionally receives the instruction address AI.

The control word MC comprises location information IE with the same format as a data address and selection information IS which controls the address generator. It therefore has the same structure as a control word that the program controller would produce for direct addressing if the invention were not implemented. Thus the controller is not modified.

The data address AD b fits in length is produced from the location information by substituting bits of the instruction address for some of its bits. This operation is specified by the selection information IS which specifies for each of the location information bits concerned which bit of the instruction address replaces it. The address generator therefore enables two addressing modes:

—a direct addressing mode in which the data address is the location information, the selection information bringing about no substitution, —a computed addressing mode in which the data address is a combination of the location information bits and the instruction address.

One specific implementation of the address generator GA will now be described by way of non-limiting example.

In this example the data address is divided into two parts:

—a first part comprising the high order bits, each of these bits being equal to the location information bit of the same order, —a second part comprising the low order bits in the form of a sequence of consecutive bits from the instruction address.

The selection information IS is in this example the combination of an extent code and an operation code. The extent code specifies the variable number e of bits in the second part of the data address and the operation code specifies the order of the first bit of the instruction address that will be the lowest order bit of the data address.

Figure 2:
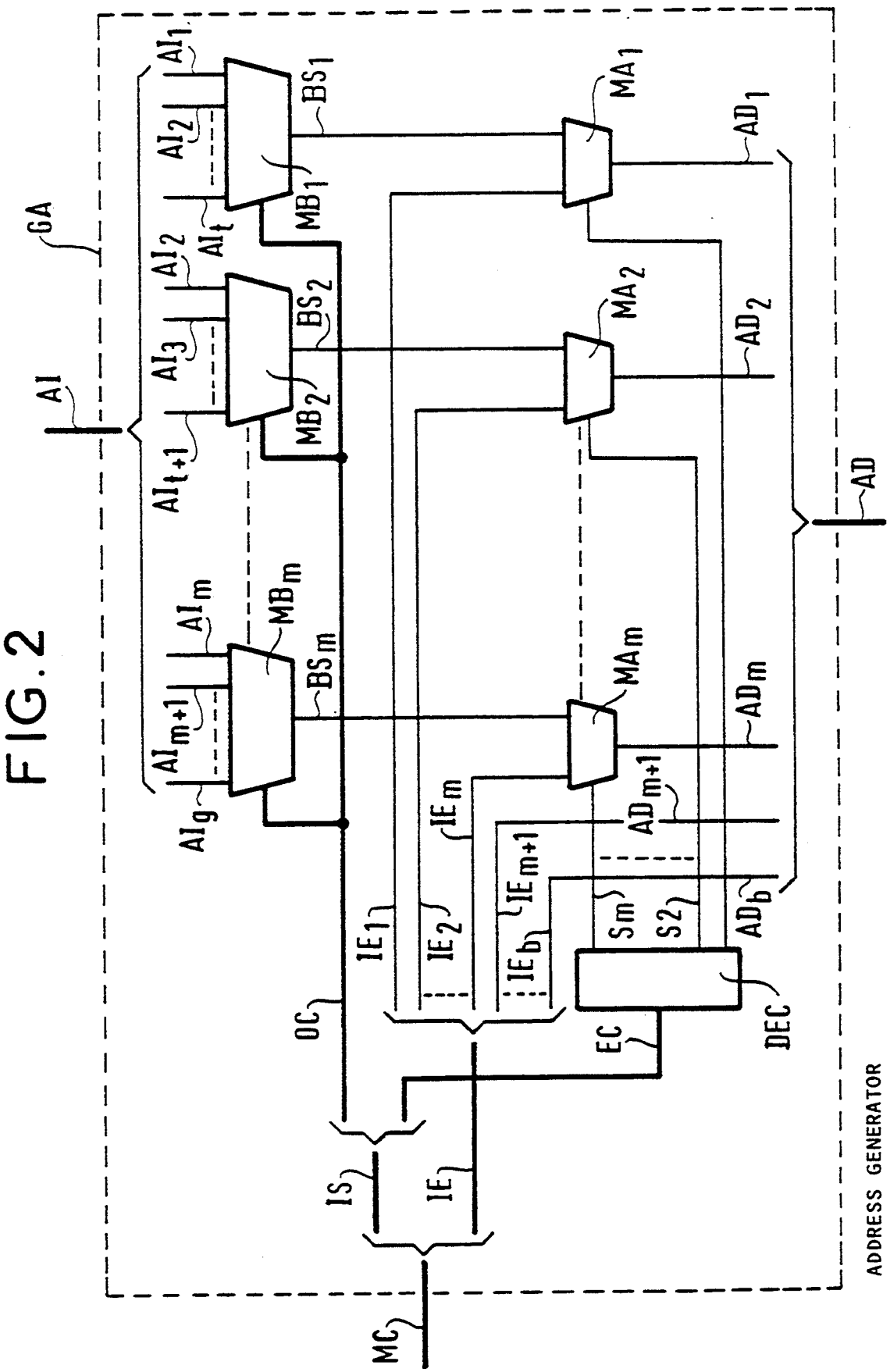
FIG. 2 is a diagram of one embodiment of address generator in accordance with the invention.

The address generator is in the form of the circuit shown in FIG. 2, for example.

Adopting a widely accepted convention, the bits of a word will be numbered from 0. The data address AD is made up of b bits $AD_1$ through $AD_b$ in which the suffix represents the order of the bit increased by one unit. The first m bits of this address are supplied by a first group of m multiplexers $MA_1$ through $MA_m$. The bits of order greater than m are the same order bits of the location information.

The address generator comprises a decoder DEC which produces m selection signals $S_1$ through $S_m$ from the extent code EC such that the latter signals are in a first state if their subscript is greater than the number e of bits in the second part of the data address and in a second state if their subscript is less than or equal to e. The number e is necessarily less than or equal to the number m. To give a numeric example, the second selection signal $S_2$ will be in a first state if e is greater than 2 and in a second state if e has the value 0, 1 or 2. The decoder is justified only if e is variable, that is to say if it can assume values other than 0 and m. If this is not the case, all the selection signals have the same value for any state of the extent code and therefore constitute a single selection signal.

The address generator therefore comprises a first group of multiplexers $MA_1$ through $MA_m$. The first multiplexer $MA_1$ produces the first data address bit $AD_1$ which takes the value of the first bit $IE_1$ of the location information IE applied to its first input or a first bit $BS_1$ selected from those of the instruction address AI applied to its second input according to whether the first selection signal $S_1$ is in its first or second state, respectively. The second multiplexer $MA_2$ produces the second data address bit $AD_2$ which takes the value of the second bit $IE_2$ of the location information IE applied to its first input or a second bit $BS_2$ selected from those of the instruction address AI applied to its second input according to whether the second selection signal $S_2$ is in its first or second state, respectively. The characteristics of the other multiplexers are easily deduced from those of the first two by a process of iteration. To formulate this generally, the nth multiplexer $MA_n$, where n is between 1 and m, inclusive, produces the nth data address bit $AD_n$ which takes the value of the nth bit $IE_n$ of the location information IE applied to its first input or an nth bit $BS_n$ selected from those of the instruction address AI according to whether the nth selection signal $S_n$ is in its first or second state, respectively.

In a first form of the invention which is not shown in FIG. 2, the selected bits $BS_1$ through $BS_m$ are particular bits of the instruction address.

According to an additional feature of the invention which is shown in FIG. 2, each of these selected bits can assume on command the value of one of several bits of the instruction address, as will now be explained.

An indexing set is formed from all or some of the bits of the instruction address AI. These bits are denoted by the letters AI with a subscript between 1 and g where y is less than b, specifying their order within the indexing set. An advantageous solution is to choose for a given subscript bit the bit one order lower in the instruction address AI. Given by way of example only, this solution is evidently not the only possible solution.

The address generator comprises a second group of multiplexes $MB_1$ through $MB_m$ equal in number to the multiplexers of the first group and each having t inputs where t is greater than zero but less than g;. The first multiplexer $MB_1$ produces the first selected bit $BS_1$ as that applied to its input of order f where f is between 1 and t, inclusive, in response to the operation code OC which specifies this order f. It receives on its first input the first bit $AI_1$ of the indexing set, on its second input the second bit $AI_2$ of this set, and so on up to its input of order t which receives the bit $AI_t$ of order t of this same set. In the same way, the second multiplexer $MB_2$ produces the second selected bit $BS_2$ as that applied to its input of order f. It receives on each input the bit from the indexing set whose order is one unit higher than that of the input in question, so that its first input receives the second bit $AI_2$ of this set, its second input receives the third bit $AI_3$ of this system and so on up to its input of order t which receives the bit $AI_{t+1}$ of order $(t+1)$ of the set. The characteristics of the other multiplexers are readily deduced from those of the first two by a process of iteration.

To formulate this generally, the nth multiplexer $MB_n$ receives on its input of order k the bit of order $(n+k-1)$ of the indexing set for any value of k between 1 and t and produces the nth selected bit $BS_n$ as that applied to its input of order f in response to the operation code OC. Note that the number g of bits of the indexing set is the sum of the number m of multiplexers and the number t of inputs of each multiplexer.

The structure of the address generator having been described, various possible applications of the generator will now be explained.

A first application enables direct addressing of the data memory RAM as already explained. The program controller produces an extent code EC such that the number e takes a null value, which eliminates the second part of the data address AD, which is then equal to the location information IE.

The generator can also be used with advantage to address the data memory RAM in the context of executing an instruction loop. Three specific instances will be described in detail: incremental addressing, modular addressing and circular addressing, in connection with a loop comprising a number of instructions which is a power of 2 ($2^p$) where p is greater than zero.

The loop begins by resetting the instruction counter CI to the start value V. The instruction address AI is increased by one unit on each new instruction.

Incremental addressing consists in increasing the data address AD by one unit for each execution of the instruction loop. To this end, the program controller CP will produce an operation code OC such that all the multiplexers $MB_1$ through $MB_m$ of the second group select their input of order p. The high order bits of the data address AD are those of the location information. Its low order bits are a sequence of bits of order p or greater of the instruction address AI.

The program controller CP also specifies in the extent code EC how many bits this series comprises.

Modular addressing consists in increasing the data address by a number which is a power of 2 ($2^q$) on each execution of the loop, the value of q being less than that of p. To this end, the program controller CP will produce an operation code OC such that all the multiplexers $MB_1$ through $MB_m$ of the second group select their inputs of order $(p-q)$. The high order bits of the data address AD are those of the location information. Its low order bits are a series of bits of the instruction address AI of order $(p-q)$ or greater. The program controller CP also specifies in the extent code EC how many bits this series comprises.

Circular addressing is a variant of incremental or modular addressing.

Incremental circular addressing is used when the loop is repeated r times where r is the product of an integer u and a number which is a power of 2 ($2^s$). On the first $2^s$ executions of the loop, the data address AD is increased by one unit on each execution. On the next $2^s$ executions, the data address AD takes for each execution the value that it took $2^s$ executions beforehand. This continues until r executions have been completed. In other words, the second part of the data address is equal to the number of executions already done modulo $2^s$. To this end, the program controller CP produces an operation code OC such that all the multiplexers $MB_1$ through $MB_m$ of the second group select their input of order p and an extent code EC such that the first s multiplexers $MA_1$ through $MA_s$ of the first group transmit the selected bits $BS_1$ through $BS_s$ and the other multiplexers of the first group transmit the corresponding bits of the location information IE.

Modular circular addressing is also used when the loop is repeated r times where r is the product of an integer u and a number which is a power of 2 ($2^s$).

However, for the first $2^s$ executions of the loop, the data address AD is increased by a number which is a power of 2 ($2^q$) for each execution. For the next $2^s$ executions, the data address AD takes for each execution the value that it had $2^s$ executions beforehand, and so on until r executions have been completed. In other words, the second part of the data address is equal to the product of the number of executions already done and $2^q$, modulo $2^s$.

To this end, the program controller CP produces an operation code OC such that all the multiplexers $MB_1$ through $MB_m$ of the second group select their inputs of order $(p-q)$ and an extent code EC such that the first s multiplexers $MA_1$ through $MA_s$ of the first group transmit the selected bits $BS_1$ through $BS_s$ and the other multiplexers of the first group transmit the corresponding bits of the location information IE.

One application of the present address generator will now be explained to illustrate some of these possibilities.

The processor receives pairs of digital samples A(i), B(i) where i is an integer which takes in succession all values between 1 and 160.

It must average these samples over 16 successive values; in other words, if $\overline{A}$ denotes the mean value of A:

$$A(j) = \sum_{k=1}^{16} A(16 \cdot j + k)$$

$$B(j) = \sum_{k=1}^{16} B(16 \cdot j + k)$$

In the above equations, j takes all integer values between 0 and 9 and i is equal to $(16.j+k)$.

It must also produce corrected samples Ac(i), Bc(i) obtained by subtracting Ao and Bo respectively from A(i) and B(i):

$$Ac(i)=A(i)-Ao$$

$$Bc(i)=B(i)-Bo$$

All the operations that must be carried out by the processor can be translated into the form of a sequence of instructions in which, adopting a known convention, the term to the left of an equals sign identifies an output register of an operator, adder or multiplier, for example, or a location of the data memory at which the result of the operation to the right of the equals sign is stored. This sequence of instructions comprises two loops, loop 1 and loop 2:
—Initialization phase
—Loop 1: for j=0 to 9, do
—Loop 2: for k=1 to 16, do
—A(j)=A(j)+A(i)
—A(i)=A(i)+Ao
—B(j)=B(j)+B(i)
—B(i)=B(i)+Bo
—End loop 2
—End loop 1

The data memory comprises:
—in a first part, the data A(j) stored in order of increasing j at locations identified by ten successive addresses,
—in a second part, the data B(j) stored in order of increasing j at locations identified by ten successive addresses,
—in a third part, the data A(i), B(i) stored alternately in order of increasing i at locations identified by 320 successive addresses so that, for any value of i, B(i) appears immediately after A(i),
—in a fourth part, the data Ao, Bo at any locations.

This memory is accessed in the following modes:
—direct addressing for the data Ao, Bo,
—incremental addressing for the data A(j), B(j):
the second part of the data address AD comprises four bits, as specified by the extent code EC, the lowest order bit of this address being the sixth bit of the instruction counter, which is specified by the operation code 0C, because loop 1 comprises $2^6$ instructions, and the first part of this address is provided by the location information IE,
—modular addressing for the data A(i), B(i):
the second part of the data address AD comprises nine bits, the lowest order bit of this address being the first bit of the instruction counter and therefore increasing by two units on each execution of loop 2 which comprises $2^2$ instructions, and the first part of this address is provided by the location information and can, in this case, be the same for A(i) and B(i).

There is claimed:

1. A processor data memory address generator receiving an instruction address from an instruction counter and a control word from a program controller which receives instructions from a program memory addressed by said instruction counter, said program controller producing a program signal addressed to an arithmetic and logic unit, said instruction counter being incremented by a clock signal and reset by said program controller, wherein said control word comprises location information and selection information and said address generator comprises means for producing a data address b bits in length having a first part comprising bits of said location information and a second part formed by a selected set of bits of the instruction address, said selected set of bits being identified by said selection information.

2. A processor data memory address generator according to claim 1 wherein said second part of said data address represents the lower order bits of said data address.

3. A processor data memory address generator according to claim 1 wherein said second part of said data address is formed by consecutive bits of said instruction address.

4. A processor data memory address generator according to claim 1 wherein said selection information comprises an extent code specifying the variable number e of bits of said second part wherein e is an integer greater than or equal to zero and less than b.

5. A processor data memory address generator according to claim 4 further comprising a first group of m multiplexers, where m is equal to the largest possible value of the variable number e, each of said multiplexers receiving on a first input a selected bit of said location information and on a second input a selected bit of said instruction address, and wherein the nth multiplexer, for any value of n between 1 and m, inclusive, provides as an output, the signal applied to a first input if n is greater than e or the signal applied to a second input otherwise, said second part of the data address being established on the basis of the output signals of said multiplexers of order e or lower and said first part of said address being established on the basis of the non-selected bits of said location information and the output signals of said multiplexers of order greater than e.

6. A processor data memory address generator according to claim 5 further comprising a decoder producing from said extent code selection signals to control said multiplexers.

7. A processor data memory address generator according to claim 5 wherein an indexing set comprises at least some of the bits of said instruction address each assigned an order number, and wherein said selection information further comprises an operation code specifying an order f greater than zero, indicating that said second part of the data address is made up of e bits of said indexing set of order numbers from f to f+e−1.

8. A processor data memory address generator according to claim 7 further comprising a second group of m multiplexers of which the nth multiplexer, for any value of n between 1 and m, inclusive, receives on an input of order number k, where k is greater than or equal to 1, the bit of order number (n+k−1) of said indexing set, and has an output connected to the second input of the nth multiplexer of said first group of m multiplexers, wherein all the multiplexers of said second group provide as an output, the signal applied to their input of order number f by means of said operation code.

9. A processor data memory address generator receiving an instruction address from an instruction counter and a control word from a program controller which receives instructions from a program memory addressed by said instruction counter, said program controller producing a program signal addressed to an arithmetic and logic unit, said instruction counter being incremented by a clock signal and reset by said program controller, wherein said control word comprises location information and selection information and said address generator comprises means for producing a data address b bits in length having a first part comprising bits of said location information and a second part formed by a selected set of bits of the instruction address, said selected set of bits being identified by said selection information to increment said data address during the repetition of a loop of $2^p$ instructions, the second part of the data address being incremented by one unit each time said loop is executed and being made up of e bits of the instruction address form order p to $p+e-1$, where p is greater than zero, and e is greater than or equal to zero.

10. A processor data memory address generator receiving an instruction address from an instruction counter and a control word from a program controller which receives instructions from a program memory addressed by said instruction counter, said program controller producing a program signal addressed to an arithmetic and logic unit, said instruction counter being incremented by a clock signal and reset by said program controller, wherein said control word comprises location information and selection information and said address generator comprises means for producing a data address b bits in length having a first part comprising bits of said location information and a second part formed by a selected set of bits of the instruction address, said selected set of bits being identified by said selection information to modularly change said data address during the repetition of a loop of $2^p$ instructions, the second part of the data address being incremented by $2^q$ units on each execution of said loop where q is less than p, and comprising e bits of the instruction address from order $(p-q)$ to $p-q+e-1$, where p is greater than zero, and e and q are greater than or equal to zero.

11. A processor data memory address generator receiving an instruction address from an instruction counter and a control word from a program which receives instructions from a program memory addressed by said instruction counter, said program controller producing a program signal addressed to an arithmetic and logic unit, said instruction counter being incremented by a clock signal and reset by said program controller, wherein said control word comprises location information and selection information and said address generator comprises means for producing a data address b bits in length having a first part comprising bits of said location information and a second part formed by a selected set of bits of the instruction address, said selected sets of bits being identified by said selection information to circularly increment said data address during the repetition of a loop of $2^p$ instruction r times, the second part of the data address being equal to the number of executions of said loop already done modulo a specific number $2^s$, r being the product of an integer u and $2^s$, said second part comprising s bits of the instruction address of order p to $(p+s-1)$, where p is greater than zero, and s is greater than or equal to zero.

12. A processor data memory address generator receiving an instruction address from an instruction counter and a control word from a program controller which receives instructions from a program memory addressed by said instruction counter, said program controller producing a program signal addressed to an arithmetic and logic unit, said instruction counter being incremented by a clock signal and reset by said program controller, wherein said control word comprises location information and selection information and said address generator comprises means for producing a data address b bits in length having a first part comprising bits of said location information and a second part formed by a selected set of bits of the instruction address, said selected set of bits being identified by said selection information by circulary modularly change said data address during the repetition of a loop of $2^p$ instruction r times, the second part of the data address being the product of a number $2^q$ and the number of executions of said loop already done modulo a particular number $2^s$, q being less than p, and r being the product of an integer u and $2^s$, said second part comprising s bits of the instruction address of order $(p-q)$ to $(p-q+e-1)$, where p is greater than zero, and s and q are greater than or equal to zero.

* * * * *